United States Patent [19]

Streit

[11] Patent Number: 4,643,325
[45] Date of Patent: Feb. 17, 1987

[54] BAIL MOUNTING STRUCTURE
[75] Inventor: Kenneth F. Streit, Mt. Prospect, Ill.
[73] Assignee: Geerpres, Inc., Muskegon, Mich.
[21] Appl. No.: 762,148
[22] Filed: Aug. 2, 1985
[51] Int. Cl.⁴ .............................................. B65D 25/32
[52] U.S. Cl. ...................................... 220/91; 220/95
[58] Field of Search ............................... 220/91, 92, 95

[56] References Cited
U.S. PATENT DOCUMENTS

| | | |
|---|---|---|
| 458,352 | 8/1891 | Sturges . |
| 790,689 | 9/1905 | Judkins . |
| 1,443,995 | 2/1923 | Lennox . |
| 1,694,165 | 10/1927 | Debacher . |
| 1,883,823 | 10/1932 | Renshaw . |
| 2,079,126 | 5/1937 | Maas . |
| 2,088,605 | 8/1937 | McCarthy . |
| 2,156,274 | 5/1939 | Brown . |
| 2,571,369 | 10/1951 | King et al. ............................ 220/91 |
| 2,624,487 | 1/1953 | Fry . |
| 3,028,042 | 4/1962 | Gottsegen ......................... 220/95 X |
| 3,116,528 | 1/1964 | Poe . |
| 3,128,905 | 4/1964 | Hesslein ............................... 220/95 |
| 3,185,383 | 5/1965 | Krause et al. . |
| 3,334,782 | 8/1967 | Friberg . |
| 3,389,828 | 6/1968 | Godshalk ......................... 220/95 X |
| 3,464,586 | 9/1969 | Hitzeroth . |
| 4,008,822 | 1/1977 | Carroll . |
| 4,196,821 | 4/1980 | Teti, Jr. et al. . |
| 4,293,073 | 10/1981 | Yates, Jr. ........................... 220/91 X |

FOREIGN PATENT DOCUMENTS

| | | | |
|---|---|---|---|
| 529968 | 7/1954 | Belgium ............................. 220/91 |
| 8200147 | 1/1982 | Netherlands . | |
| 2051727 | 1/1981 | United Kingdom . | |

Primary Examiner—Steven M. Pollard
Attorney, Agent, or Firm—Harness, Dickey & Pierce

[57] ABSTRACT

The present invention pertains to the field of bail mounting structures. The bail mounting device of the present invention provides for an essentially non-removable bail. This non-removability is accomplished by a bail mounting device comprising an elongated planar member, an aperture in the planar member, a recess on the planar member concentric with the aperture, and a retaining means positioned in the recess for securing the bail into the mounting device. The mounting device is positioned in a mounting receptacle on a container. The bail is inserted through an aperture in the outer wall of the receptacle, through the elongated planar member, through the retaining means and finally nesting in a recess in the wall of the container, thus, providing a virtually non-removable bail for a container.

15 Claims, 5 Drawing Figures

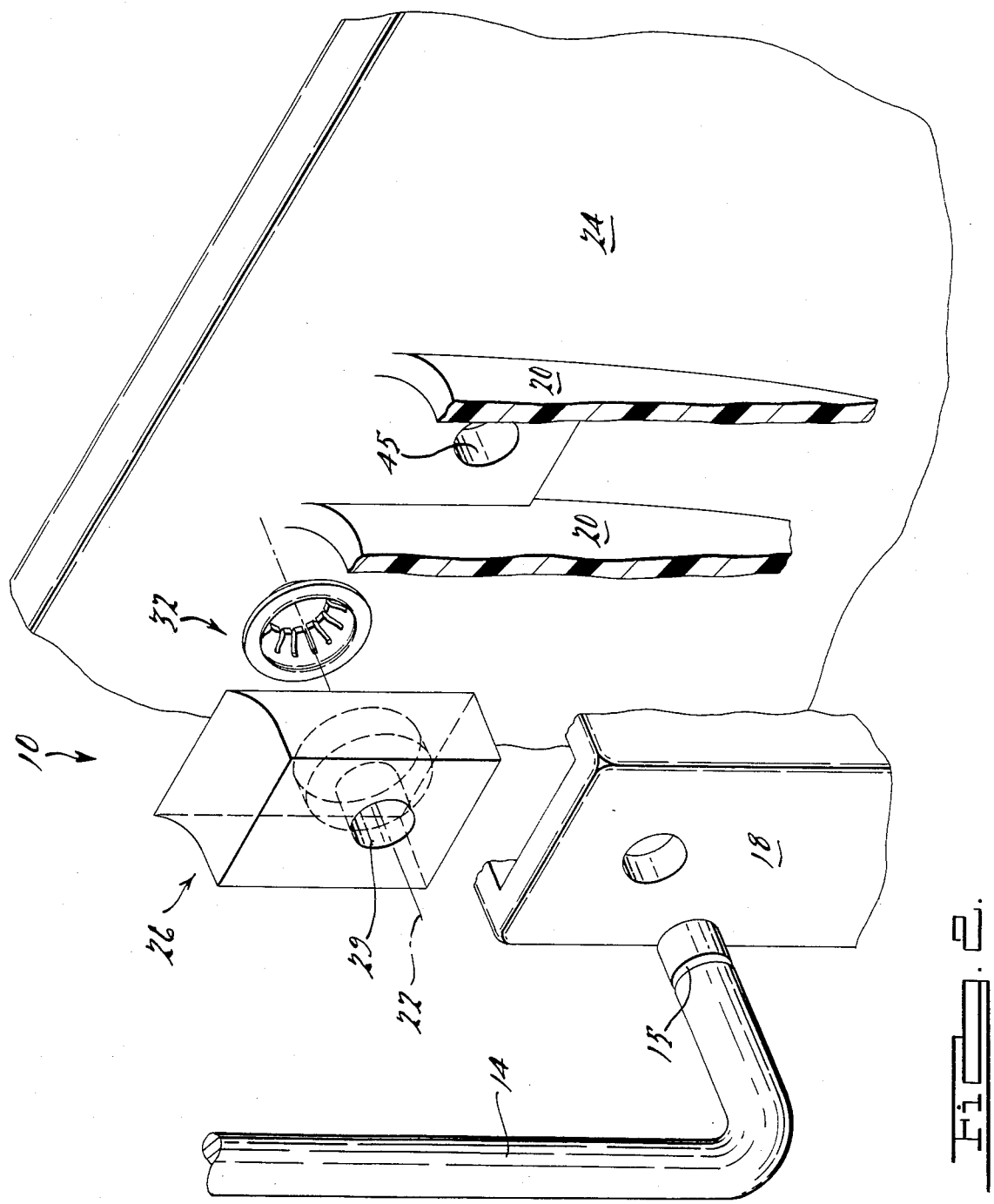

4,643,325

BAIL MOUNTING STRUCTURE

BACKGROUND AND SUMMARY OF THE INVENTION

The present invention relates to bail mounting structures. Several types of bail mounting structures exist for securing bails or handles to containers. More particularly, the present invention relates to bails associated with large mop buckets. In the past, bail mounting structures have had the problem of being easily removed from their container. This problem was due to several factors; excessive weight causing failure of the mounting structure; easy egress of the bail from the mounting structure; neglect and abuse of the container causing mounting structure failure. Several bail mounting structures have been designed to eliminate these problems. However, the existing bail mounting structures have not solved these problems. Thus, there is a need in the field for a bail mounting structure capable of solving these problems. The present invention presents a simple, novel structure having excellent strength and securing properties for maintaining the bail on the container.

Accordingly, it is the primary object of the present invention to virtually eliminate the possibility of detaching a bail from its container. Another object of the present invention is to provide a bail mounting structure having an aesthetically pleasing appearance. Yet another object of the present invention is to provide a bail mounting structure which is inexpensive and easy to manufacture. Still another object of the present invention is to provide a bail mounting structure enabling easy insertion of the bail into the mounting structure and container.

To achieve the foregoing objects, the present invention provides a container having an outer wall with an aperture therein, an inner wall having a recess therein, a slot between the two walls, an elongated planar member positioned in the slot, the planar member having an aperture, recess, and a retaining means mounted thereon. The planar member aperture and recess are concentric with one another and are concentric with the outer wall aperture and inner wall recess. A bail is positioned onto the container by passing the bail end through the outer wall, planar member and retaining means. The bail end finally nests in the container recess, thus, securing the bail on to the container.

Additional objects and advantages of the present invention will become apparent from a reading of the detailed description of the preferred embodiments which make reference to the following set of drawings.

BRIEF DESCRIPTION OF THE DRAWINGS

FIG. 2 is an exploded perspective view of the bail mounting structure of the present invention.

DETAILED DESCRIPTION OF THE PREFERRED EMBODIMENT

Figure 1:
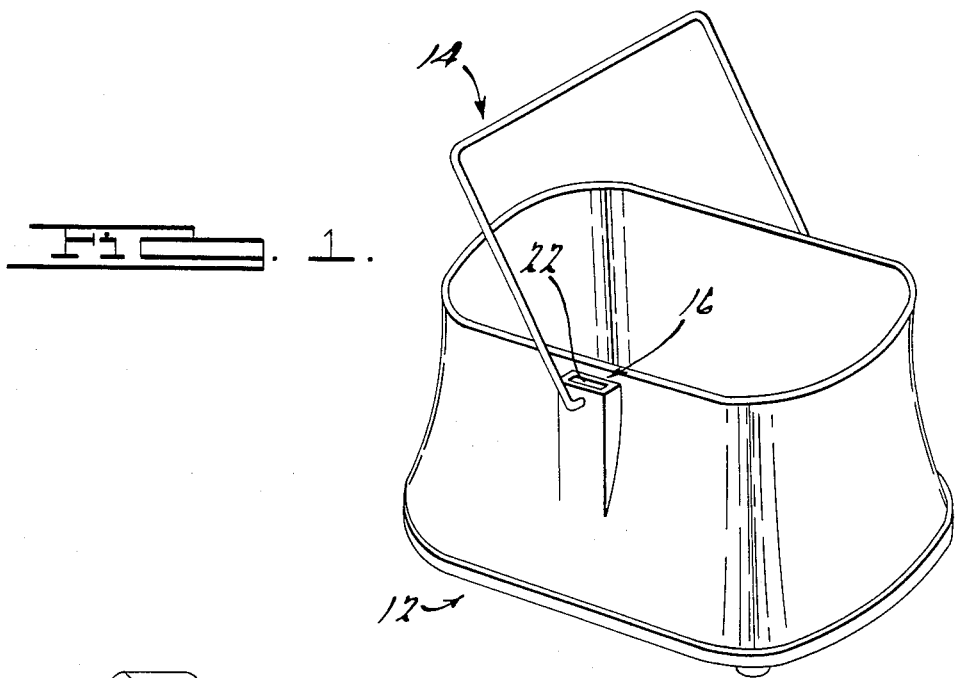
FIG. 1 is a perspective view of a container having a bail positioned in the mounting structure of the present invention.

Referring to FIG. 1, a perspective view of a mounting structure 10, on a container 12, according to the present invention is shown. The container 12 has a bail 14 which is securely fastened in the mounting structure 10. The container 12 as shown, is a mop bucket, however, the container 12 could be any desired containing means. A plurality of mount retaining receptacles 16 are positioned on the container 12. The mount retaining receptacle 16 comprises an outer wall 18, side walls 20 and the container wall 24. The mount retaining receptacle 16 has a slot 22 formed between the outer wall 18 and the container wall 24. The slot 22 has an overall rectangular shape and enables easy insertion of the mounting structure 10 into the mounting receptacle 16.

Now referring to FIGS. 2-5, illustrating detailed embodiments of the mounting structure 10. The mounting structure 10 comprises an elongated planar member 26, an aperture 28, a recess 30 and a retaining means 32. The elongated planar member 26, best seen in FIG. 4, has an overall rectangular shape. An annular flange 34 extends from one of the rectangular members' longitudinal sides. The other longitudinal side has a pair of rounded corners 36. The lateral edges 38, of the rectangular member 26, depart at a desired angle from the rounded corners 36. The rectangular elongated member 26 is inserted into the slot 22 of the mounting receptacle 16. The annular flange 34 of the elongated member 26, when inserted in the slot 22, gives a neat continuous appearance to the mounting receptacle 16. This aesthetic appearance enables the elongated member 26 and the mounting receptacle 16 to be viewed as a one-piece construction with the container wall 24.

The aperture 28, in the elongated member 26, is positioned below the member's central longitudinal axis 40. The aperture 28 is positioned approximately upon the member's central lateral axis 42. The aperture is positioned in the bottom half of the rectangular member 26. The aperture 28 is preferably circular, having its interior walls 29 angling at a desired angle with respect to the aperture central axis 27. The diameter of the aperture 28 is approximately equal to the diameter of the bail 14 ensuring a snug fit when the bail 14 is passed through the aperture 28.

The recess 30 has a circular design and is concentric with the aperture 28. The recess 30 is countersank into the elongated planar member 26 a desired distance. The depth of the recess 30 is proportional to the height of the retaining means 32. The diameter of the recess 30 is approximately smaller than the diameter of the retaining means 32. This ensures a good tight fit of the retaining means 32 into the recess 30. The recess 30 is positioned adjacent to the container wall 24.

Figures 3, 4:
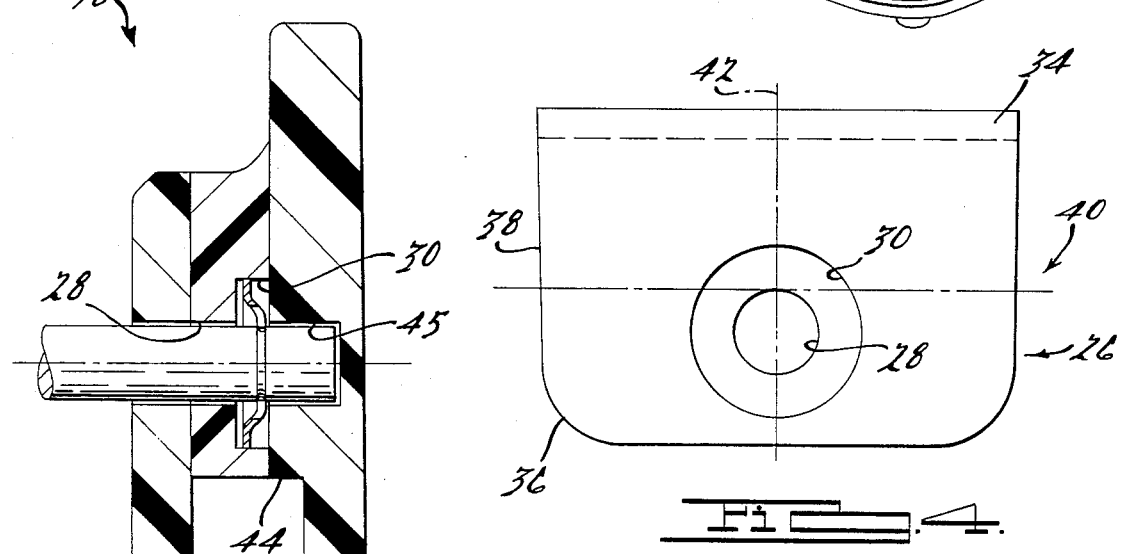
FIG. 3 is a cross-sectional view of the bail mounting structure secured in a container.
FIG. 4 is a plan view of the planar member of the mounting structure of the present invention.
Figure 5:
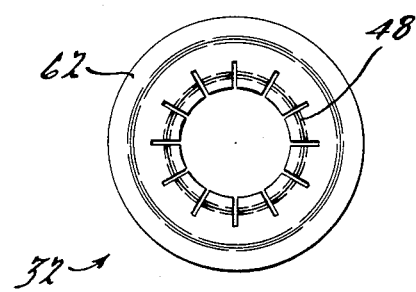
FIG. 5 is a plan view of the retaining means of the mounting structure of the present invention.

The container wall 24 has a projection 44, best seen in FIG. 3, for abutting the mounting structure 10 adjacent to the recess 30. The projection 44 has a recess 45 for the nesting of the bail 14 in the container 24. The recess 45 has a diameter approximately equal to the diameter of the bail 14.

The retaining means 32 has a circular bowl-shaped design, having a base diameter approximately larger than the diameter of the recess 30, best seen in FIG. 2. The retaining means 32 has an aperture 46 having a diameter approximately smaller than the diameter of the bail 14. The bowl walls 48 may be of a one-piece design or a plurality of extending fingers positioned from the base 62 of the retaining means 32. The bail 14 is inserted into the retaining means aperture 46, wherein the retaining means 32 resiliently flexes, securing the bail into the retaining means 32. The retaining means 32 may be manufactured from any type of metallic material, preferably spring steel. The retaining means 32 is generally known in the field as a push nut.

In another embodiment of the invention the bail end may be scored. A score 15 or groove is engraved into the circumference of the bail. The score 15 is a predetermined distance from the bail end enabling it to be positioned in the aperture of the retaining means 32. As the scored portion passes through the retaining means aperture 46, the retaining means 32 resiliently flexes, trapping the bail, at the score, into the retaining means 32, thus securing the bail 14 into the container receptacle 16.

The retaining means 32 is positioned in a tight fitting relationship in the recess 30 of the elongated member 26. The elongated member 26 is inserted into the container receptacle slot 22. The elongated member 26 is positioned so that the recess 30 is abutted adjacent to the wall projection 44. The outer wall aperture, elongated member aperture 28, retaining means aperture 46 and the projection recess 45 are positioned coaxially. The bail 14 is inserted through the outer wall 18, the elongated planar member 26, the retaining means 32, and nests in the projection 44. The bail 14 as positioned, is securely fastened into the container 12. The retaining means 32 virtually affixes the bail 14 permanently into the bail mounting structure 10.

While it will be apparent that the preferred embodiment as illustrated herein are well calculated to fill the objects of the above-stated, it will also be appreciated that the present invention is susceptible to modification and variation without change from the scope and spirit of the present invention.

What is claimed is:

1. A bail mounting structure for a container having a plurality of receptacles for maintaining the mounting structure, the receptacles having an outer wall and side walls forming a slot between the outer wall and the container wall for inserting the bail mounting structure, the container wall having a recess for receiving a bail, the outer wall having an aperture for receiving the bail; the bail mounting structure comprising: an elongated planar member insertable into said receptacle slot, an aperture in said planar member for passage of a bail through said elongated planar member, a recess in said planar member, said recess being concentric with said planar member aperture, a retaining means for securing the bail into said mounting structure.

2. The bail mounting structure as in claim 1, wherein said elongated planar member has an overall rectangular shape having lateral and longitudinal sides, at least one of said longitudinal sides having an annular flange extending therefrom, said other longitudinal side having rounded corners, said aperture being positioned below a central longitudinal axis and approximately on a central lateral axis.

3. The bail mounting structure as in claim 2, wherein said aperture and recess are circular, said circular recess being countersank to a desired distance for securing said retaining means in said recess.

4. The bail mounting structure as in claim 3, wherein said retaining means has an overall circular bowl shape having an aperture in its center, said aperture having a diameter approximately smaller than the diameter of said bail for securing said bail in said retaining means.

5. The bail mounting structure as in claim 4, wherein said retaining means base diameter is approximately larger than said recess for securing said retaining means in said elongated member.

6. A bail mounting assembly for a container comprising, a container, said container having a plurality of receptacles for maintaining a mounting device, said receptacles having an outer wall and side walls forming a slot between said outer wall and said container wall for inserting the bail mounting device, said container wall having a recess for receiving a bail, said outer wall having an aperture for receiving said bail, an elongated planar member insertable into said receptacle slot, an aperture in said planar member, said aperture in alignment with said outer wall aperture and said container recess enabling said bail to pass through said apertures and nest in said recess, a recess in said planar member, said recess being concentric with said planar member aperture, a retaining means positioned in said recess, said retaining means having an aperture in alignment with said outer wall, said planar member apertures and said container recess for permanently securing said bail to said container.

7. The bail mounting assembly as in claim 6, wherein said elongated planar member has an overall rectangular shape having lateral and longitudinal sides, at least one of said longitudinal sides having an annular flange extending therefrom, said other longitudinal side having rounded corners, said aperture being positioned below a central longitudinal axis and approximately on a central lateral axis.

8. The bail mounting assembly as in claim 7, wherein said retaining means has an overall circular bowl shape having said aperture at its center, said aperture having a diameter approximately smaller than the diameter of said bail for securing said bail in said retaining means.

9. The bail mounting assembly as in claim 8, wherein said retaining means diameter is approximately larger than said recess for securing said retaining means in said elongated member.

10. The bail mounting assembly as in claim 9, wherein said retaining means has a plurality of fingers thereon.

11. A bail mounting device for a container having a plurality of receptacles for maintaining the mounting device, the receptacles having an outer wall and side walls forming a slot between the outer wall and the container wall for inserting the bail mounting device, the container wall having a recess for receiving a bail, the outer wall having an aperture for receiving the bail; the bail mounting device comprising: an elongated member having lateral and longitudinal sides insertable into said receptacle slot, at least one of said longitudinal sides having an annular flange extending therefrom, an aperture in said elongated member being positioned below a central longitudinal axis and approximately on a central lateral axis for passage of a bail through said elongated planar member, a recess in said planar member, said recess being positioned concentric with said aperture, a retaining means positioned in said recess, said retaining means having an aperture positioned concentric with said elongated planar member aperture, said retaining means securing said bail in said mounting device.

12. The bail mounting device as in claim 11, wherein said elongated planar member has an overall rectangular shape, said other longitudinal side having rounded corners.

13. The bail retaining device as in claim 12, wherein said retaining means has an overall circular bowl-shaped design, said aperture having a diameter approximately smaller than the diameter of the bail for securing the bail in said retaining means.

14. The bail retaining device as in claim 13, wherein said retaining means has a plurality of fingers for securing the bail in said retaining means.

15. The bail retaining device as in claim 14, wherein said bail has a score or groove a predetermined distance from its ends for securing said bail in said retaining means.

* * * * *